United States Patent [19]

Hertz et al.

[11] Patent Number: 4,901,088

[45] Date of Patent: Feb. 13, 1990

[54] METHOD AND APPARATUS FOR HIGH RESOLUTION INK JET PRINTING

[76] Inventors: Carl H. Hertz, Skolbanksvagen 8, S-223 67 Lund, Sweden; Bo A. Samuelsson, Ostra Tornsvagen 25, Lund, Sweden

[21] Appl. No.: 157,776

[22] Filed: Feb. 19, 1988

[30] Foreign Application Priority Data

Apr. 14, 1987 [EP] European Pat. Off. ........ 87105560.4

[51] Int. Cl.[4] ........ G01D 15/18

[52] U.S. Cl. ........ 346/75; 346/1.1

[58] Field of Search ........ 346/75, 1.1

[56] References Cited

U.S. PATENT DOCUMENTS

| | | | |
|---|---|---|---|
| 3,596,275 | 7/1971 | Sweet | 346/75 |
| 3,916,421 | 10/1975 | Hertz | 346/75 |
| 4,006,482 | 2/1977 | Heath et al. | 346/75 |
| 4,620,196 | 10/1986 | Hertz et al. | 346/1.1 |
| 4,695,848 | 9/1987 | Padalino | 346/1.1 |

*Primary Examiner*—Bruce A. Reynolds
*Assistant Examiner*—Gerald E. Preston
*Attorney, Agent, or Firm*—Henry C. Nields

[57] ABSTRACT

A coincidence-preventing circuit prevents the graininess of image which results form coincidental arrival of a clock pulse and a load pulse at a circuit, such as a down counter, the output from which controls the timing and density of the image produced on a recording medium by an ink jet.

8 Claims, 2 Drawing Sheets

METHOD AND APPARATUS FOR HIGH RESOLUTION INK JET PRINTING

This invention generally relates to methods and apparatus for ink jet printing and plotting but more particularly this invention relates to the field of high resolution ink jet color printing and plotting.

US-A-3,916,421, included herein by reference thereto, describes an ink jet recording device in which an ink jet issues under high pressure from a nozzle and breaks up into a train of drops at a point of drop formation inside a control electrode. This train of normally uncharged drops travels in a line or along an initial axis toward a recording medium, as paper, which is mounted on or otherwise affixed to a moving support, e. g. a rotating drum of a drum plotter. On the way from the nozzle toward the paper, the drops pass a transverse electric field generated between a negatively charged high voltage electrode and a lower part of the control electrode. Now, if a positive control voltage is applied to the control electrode while the ink in the nozzle is grounded, an electric field is established at the point of drop formation causing each of the drops formed at the point of drop formation to be negatively charged. Because of the charge, these drops are deflected into a catcher and cannot reach the recording paper. Thus, the length of time during which the signal voltage or "print pulse" applied to the control electrode is zero or less than a cut-off control voltage, determines the number of drops that reach the elementary area (pixel) of the recording paper, which is aligned with the ink jet axis. Thus, the printing pulses control the amount of ink laid down at the individual pixels and therefore the densities of the pixels which in turn may form a halftone image.

An improvement of the ink jet apparatus mentioned above is described in US-A-4,620,196 also included herein by reference thereto. In this improved ink jet apparatus, the rate and position of drop formation is controlled by ultrasonic stimulation. Further, the length of the electrical print pulse determining the number of drops that reach the recording medium is adjusted such that it equals n/f, where f is the drop formation rate which is equal to the ultrasonic stimulation frequency (e. g. 1 MHz) and n is an integer chosen such that the ratio n/f is close to the length of the original print signal. Additionally, the start of the print pulse is synchronized with a suitable phase of the ultrasonic stimulation. This insures that the start of the print pulse always coincides with the same phase of the drop formation process. The effect of these measures is an appreciable reduction of the graininess of the halftone image formed by the printed pixels.

We have found that the graininess of the printed image can be further reduced by synchronizing the drop formation rate and, thus, the printing pulses, with the pixel rate.

In the known ink jet apparatus, the source, as an oscillator, which produces the ultrasonic stimulation signal which is also used as clock signal for the system is generated entirely independent of the pixel signal which determines the location of the subsequent pixels recorded on the record medium. We have found that this indefinitness of the relation between the stimulation or clock signal on the one hand and the pixel signal on the other hand is a cause for the still remaining graininess of the image. Thus, according to the present invention, the stimulation or clock signal and the pixel signal are coordinated or synchronized for further reducing the graininess of the image.

In a preferred embodiment, a digital pixel density signal, generally a color component pixel density signal, is loaded into a down counter by the pixel signal. The down counter is then clocked down to zero by the clock signal to determine the number of ink drops applied to the respective pixel. A clock/pixel signal synchronizing circuit secures that the load pulse which is derived from the pixel pulse and effects the loading of the density value into the down counter, falls between the effective, e. g. rising edges of two subsequent clock pulses which clock the down counter. Of course, any other suitable digital-to-pulse length converter may be employed instead of a down counter.

Many other advantages, features and additional objects of the present invention will become apparent to those skilled in the art upon making reference to the following detailed description and the accompanying drawings, in which preferred embodiments incorporating the principles of the present invention are shown by way of illustrative examples.

In the drawings:

FIG. 1 shows a simplified view of a part of an ink jet printer, partially in section, and a block diagram of an associated electrical circuitry which incorporates the present invention, FIG. 2 shows a circuit diagram of a clock signal/pixel signal synchronizing circuit according to a preferred embodiment of the invention FIG. 3 shows waveforms of signals occurring in the circuit of FIGS. 1 and 2 to which reference is made when explaining the configuration and operation of the synchronizing circuit.

FIG. 4 shows a circuit diagram of an alternative synchronizing circuit.

DETAILED DESCRIPTION OF PREFERRED EMBODIMENTS

The methods and apparatus of this invention can be implemented in various types of ink jet apparatus, as monochrome or multi-color ink jet printers by using various electrode systems and control schemes. However, for the sake of simplicity, the invention will be described with reference to an ink jet printing apparatus comprising a single jet as described in US-A-3,916,421 mentioned above.

Figure 1:
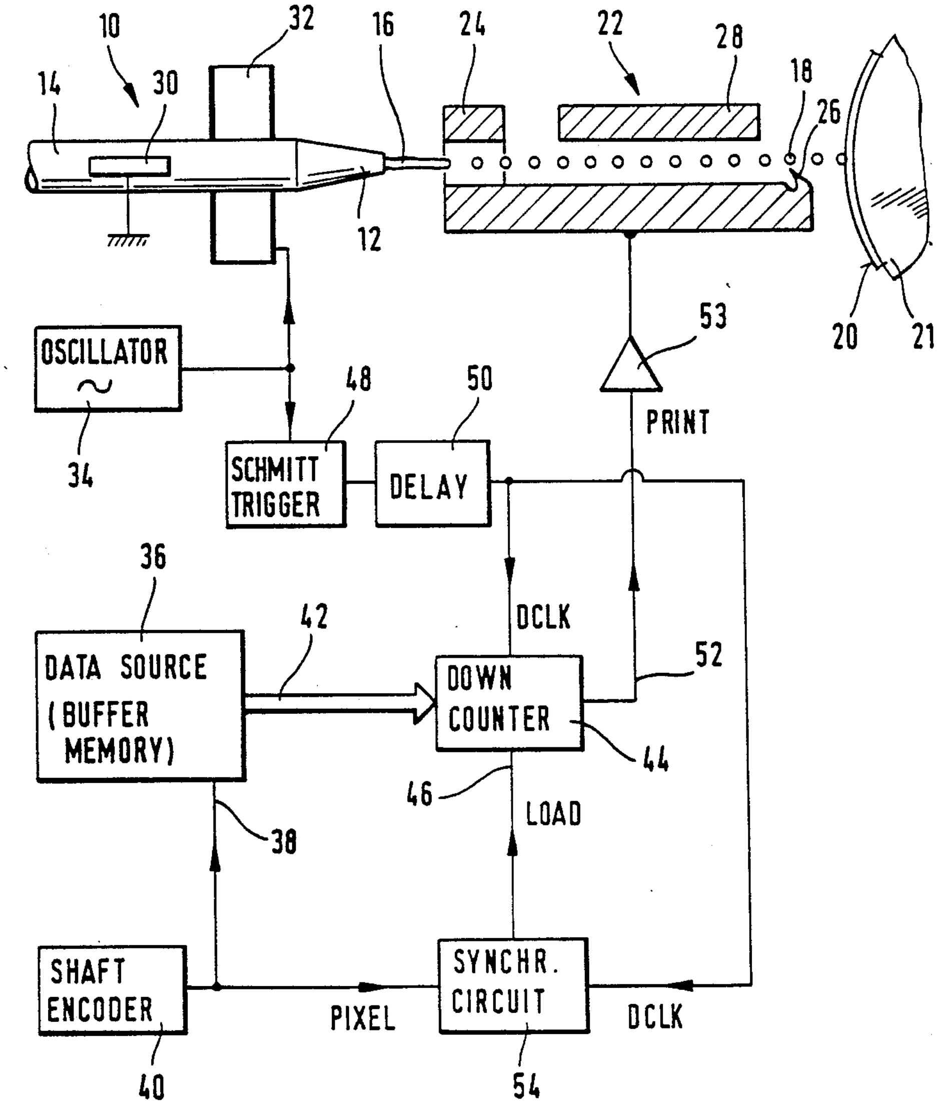

Referring to FIG. 1, the ink jet printer shown comprises droplet formation means 10 including a nozzle 12 connected by an ink conduit 14 to a pressurized ink source (not shown). In operation a high speed ink jet 16 is ejected from the nozzle 16 and breaks up, at a drop formation point, into a series of fine ink drops 18 directed along an axis to a recording medium 20 supported on a rotating drum 21 or any other suitable support movable relative to the nozzle 12.

An electrode system 22 is interposed between the nozzle 12 and the recording medium 20. The electrode system 22 is of known type and comprises a control electrode 24 which has a tubular portion surrounding the drop formation point, and an elongated portion extending toward the recording medium 20 and forming a knife edge 26 acting as drop intercepting means. The electrode system further comprises a high voltage deflection electrode 28 cooperating with the elongated portion of the control electrode. The ink within the ink conduit 14 is electrically grounded via an electrode 30 and an ultrasonic transducer 32 is coupled to the nozzle 12 for controlling the drop formation rate and location as known in the art. The transducer 32 is energized by a high frequency (e. g. 1 MHz) signal source, as an oscillator 34. The oscillator signal is also used to generate a clock signal for the electronic circuitry which controls the printing. The information determining the ink or (component) color density in each pixel is provided by a data source 36 which in this case is assumed to be a buffer memory. The buffer memory 36 has a read command input 38 coupled to the ouput of a shaft encoder 40 connected to a shaft of the drum 21 which supports the recording medium 20. The shaft encoder 40 issues a pixel pulse for each pixel location aligned with the axis of the ink jet and droplet path. The data source 36 has a digital density signal output coupled to an information input of a down counter 44 and respond to each pixel pulse applied to its read command input 38 by supplying the corresponding density value to the down counter 44. The down counter 44 has a load command input 46 and stores the momentary density value received from the data source 36 when a LOAD signal is applied to input 46. The density signal determines the number of ink droplets which are to be laid down on the present pixel location. The down counter 44 is clocked down by a signal DCLK which is derived from the output signal of the oscillator 34 via a Schmitt trigger circuit 48 and an adjustable delay circuit 50. The down counter 44 has a printing pulse output 52 on which a printing pulse appears which commences when the first DCLK pulse is received after the loading of the density value and which ends when the counter has been clocked down to zero by the DCLK pulses. The printing pulse is applied via an inverting amplifier 53 to the control electrode 24 to reduce the voltage at this electrode below the cut-off level as long as the printing pulse lasts, to allow the drops 18 to reach the paper 20.

So far described and in other respects, with the exception of the synchronizing circuitry which will be desclosed below, the apparatus may correspond to that described in US-A-4,620,196 mentioned above. In the known apparatus, the pixel pulse generated by the shaft encoder 40 is directly used as LOAD pulse and applied to the load command input 46 of the down counter 44. Since the DCLK signal stemming from the oscillator 34, and the pixel pulse signal from the shaft encoder 40 are generated entirely independent of each other, the DCLK signal and the pixel pulse load signal may interfere at the down counter which may result in some graininess of the image produced. The invention avoids this drawback by inserting a synchronizing circuit 54 into the signal path between the shaft encoder 40 and the load command input 46 of the down counter 44.

Figure 2:
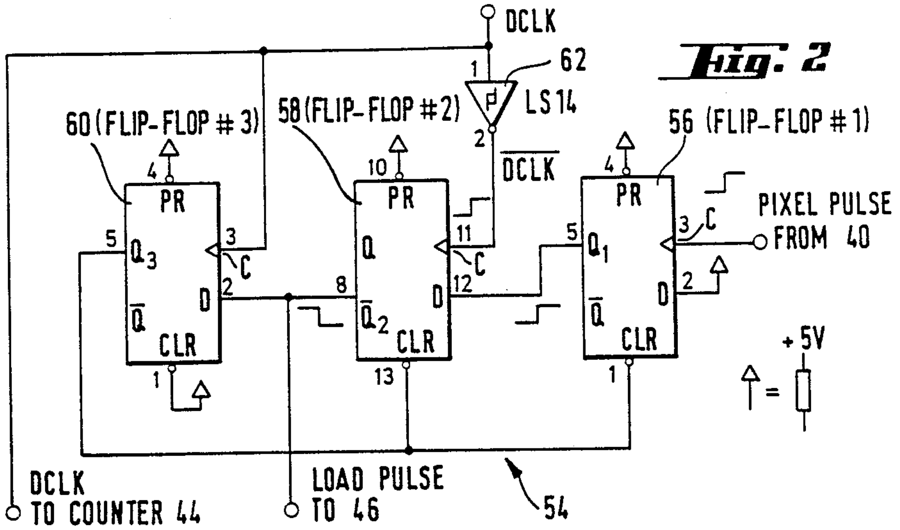

As shown in FIG. 2, the synchronizing circuit 54 comprises three D-flipflop circuits 56, 58, 60. Each D flipflop is switched into the state of the signal at its D input when the positive going edge of a clock signal pulse appears at its clock input C. It can be reset by a negative reset signal applied to its reset input CLR.

A positive signal is permanently applied to the D input of flipflop 56 which receives the pixel pulse from the shaft encoder at its clock input. The $Q_1$ output of the first flipflop 56 is coupled to the D input of the second flipflop 58. The shaped and delayed clock pulse DCLK from delay circuit 50 (FIG. 1) has a rectangular waveform with a 50% duty cycle, and is applied to the clock input of the second flipflop 58 through an inverter circuit 62. The $\overline{Q}_2$ output of the second flipflop 58 provides the load pulse LOAD and is coupled to the load command input 46 of the down counter 44 (FIG. 1). The load pulse is further applied to the D input of the third flipflop 60 which serves for resetting the first and second flipflops 56, 58 and receives the clock pulse DCLK at its clock input. The third flipflop 60 has its $Q_3$ output coupled to the reset input CLR of flipflops 56, 58. A positive voltage is permanently applied to the reset input CLR of the third flipflop 60.

Figure 3:
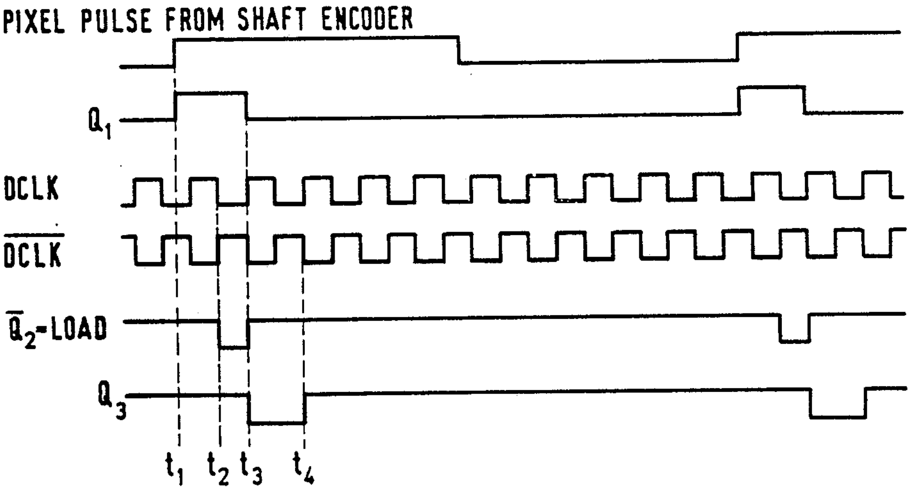

The operation of the synchronizing circuit 54 described above will now be explained with reference to FIG. 3. When the leading, positive going edge of a PIXEL pulse (first diagram in FIG. 3) from the shaft encoder appears at time $t_1$, the first flipflop 56 switches in its set state and the signal at its $Q_1$ output (second line in FIG. 3) goes positive. Thus, a positive signal is applied to the D input of the second flipflop 58. The clock signal DCLK (third line in FIG. 3) is inverted by inverter 62 and the first positive going edge of the inverted clock signal $\overline{DCLK}$ which appears after $t_1$ at $t_2$ switches the second flipflop 58 in its set state, so that the signal at is $Q_2$ output goes negative and the load pulse commences. The next positive edge of the clock pulse DCLK switches the third flipflop 60 which commences the reset pulse at its $Q_3$ output and effects the reset of the first and second flipflops 56 and 58 at time $t_3$. This removes the signal from the D input of the third flipflop so that the positive going edge of the next clock pulse switches the third flipflop 60 back in its set state at time $t_4$.

It is obvious that due to the inversion of the clock pulses by the inverter 62, the load pulse LOAD always commences exactly between the positive going edges of two subsequent clock pulses DCLK which clock the down counter 44. Thus, dead or close coincidence between the clock and load pulses is prevented and therefore any interference between these pulses is avoided.

Figure 4:
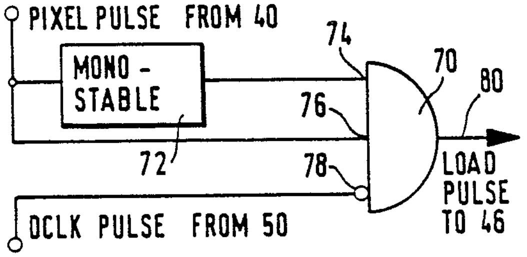

FIG. 4 shows an alternative synchronizing circuit which comprises a three input AND gate 70 and a monostable multivibrator 72. The PIXEL signal is applied to a trigger input of monostable 72 which responds to the positive edge of each PIXEL pulse by producing, at its output 80 an output pulse having a duration longer than half the period of the clock pulses DCLK and shorter than said period. This output pulse is applied to a first non-inverting input 74 of AND gate 70 which further receives at a second non-inverting input 76 the PIXEL signal. A third, inverting input 78 receives the clock signal DCLK. In operation the AND gate is enabled by the leading edges of the pixel pulse and of the monostable output pulse and triggered by the next negative going edge of the DCLK pulse which starts an output pulse used as LOAD pulse. The load pulse ends with the positive edge of the following DCLK pulse, the negative edge of which is prevented from triggering the AND gate because the monostable 72 output pulse has terminated at this time and disabled the AND gate.

Various modifications and variations of the above described preferred exemplary embodiments will occur to those skilled in the art. It should also be obvious that the synchronization between the pixel pulses and the clock pulses can be effected in a different way, e. g. the oscillator 34 can be synchronized by the output signal of the shaft encoder of the drum 21 can be driven by a synchronious motor which is energized by a signal derived from the output signal of the oscillator 34 by frequency division.

The invention is also applicable to other types of ink jet printers, e. g. printers in which the uncharged drops are intercepted and the charged drops print, as described in US-A-3,977,007 or printers in which relative transverse motion between the path of the record producing drops and the record surface is effected by other means than a drum rotable relative to the nozzle(s). Thus, also only two specific embodiments of the invention have been described, it will be understood that the invention is not limited to these specific embodiment described, but is capable of modification and rearrangement and substitution of parts and elements without departing from the spirit and scope of this invention as defined in the appended claims.

We claim:

1. An ink jet printing method wherein a record is produced by applying varying amounts of ink on a plurality of pixel locations of a record medium, said method comprising the steps:

(a) generating an ink jet directed towards said record medium, said ink jet breaking up into a series of drops with a predetermined drop formation rate, (b) applying an electric charge of predetermined magnitude to selected drops, (c) deflecting each charged drop as a function of its charge to determine whether the drop travels along a recording path to reach said recording medium or is intercepted, (d) producing relative transverse movement between said drop path and said recording medium, (e) generating a first signal indicative of the drop formation rate, (f) generating a second signal from said relative movement, the second signal being indicative that pixel position on the record medium is aligned with said drop path, (g) deriving a density value for the aligned pixel position in response to said second signal, (h) generating a print pulse signal of predetermined length between leading and trailing edges in response to said derived density value and said first signal, said density value controlling the length and said first signal controlling the time of occurrence of the leading edge of said print pulse signal, (i) controlling said charging step (b) by means of said print pulse signal, the improvement consisting in (j) combining said first and second signals to establish a non-coincidental time relationship between the time at which said density value deriving step (g) occurs and the time when the leading edge of the print pulse occurs.

2. The method as claimed in claim 1 wherein said density value deriving step (g) comprises loading into a counter a number indicating the number of drops to be applied to the aligned pixel position, and said print pulse generating step comprises counting the number loaded into said counter down to zero by a clock signal derived from said first signal.

3. The method as claimed in claims 1 or 2, wherein said non-coincidental time relationship between said deriving step (g) and the occurrence of the leading edge of the pixel pulse is so that said deriving step is performed essentially in the middle between two subsequent portions of said first signal which control the time of occurrence of the leading edge of said print pulse.

4. An ink jet printing apparatus wherein a record is produced by applying various amounts of ink on a plurality of pixel locations of a record medium, said apparatus comprising:

(a) means (10) for generating an ink jet (16) directed towards said record medium (20), said ink jet breaking up into a series of drops (18) with a predetermined drop formation rate, (b) means (24, 53) for selectively charging said drops (18), (c) means (28) for applying a deflecting force to each charged drop as a function of its charge to determine whether the drop travels along a recording path to said record medium (20) or is intercepted by intercepting means (26), (d) means (21) for producing relative movement between said path and said record medium (20), (e) means (34) for generating a first signal indicative of said drop formation rate, (f) means (40) for generating a second signal depending on said relative movement, the second signal being indicative that a pixel position on said record medium is aligned with said path of said drops which reach said record medium, (g) means (36) for deriving a density value for the aligned pixel in response to said second signal, (h) means (44) for generating a print pulse signal having a predetermined length between leading and trailing edges in response to said derived density value and said first signal, said density value controlling the length and said first signal controlling the time of occurrence of the leading edge of said print pulse signal, the improvement consisting in (i) means (54) for combining said first and second signals to establish a non-coincidental time relationship between the time at which said density value is derived and the time at which the leading edge of said print pulse signal occurs.

5. The apparatus as claimed in claim 4, wherein said means for generating said first signal comprises a high frequency source (34), and said ink jet generating means (10) comprises means (32) for applying vibrations to said ink jet (16), said vibration applying means being controlled by said high frequency signal, and wherein signal processing means (48, 50) is coupled to said high frequency source (34) to generate said first signal (DCLK).

6. The apparatus as claimed in claim 4, wherein said print pulse signal generating means (44) comprises a down counter adapted to be loaded with a number indicative of the number of drops applied to the actual pixel position.

7. The apparatus as claimed in claim 4, wherein said combining means comprises first and second flipflop circuits (56, 58) and a reset circuit (60), said first flipflop (56) being connected to be set by said second signal (pixel pulse), said second flipflop (58) being connected to be enabled by said first flipflop, when set, and to be switched into its set state by an inverted version of said first signal (DCLK) to produce, when set a signal (LOAD) to control the deriving of said density value, and said reset means (60) being adapted to reset said first and second flipflops a non-coincidental period of time after the commencing of said deriving signal LOAD.

8. The apparatus as claimed in claim 4, wherein said combining circuit comprises an AND gate (70) having first and second direct inputs (74, 76) and an ivnerse input (78), and a monostable circuit (72) which, when triggered, produces an output pulse having a length greater than half of the period of said first signal and less than said period, receiving at its input said second signal (pixel pulses) and having its output coupled to the first input (74) of said AND gate (70), the second input (76) of said AND gate receiving said second signal directly, and said inverse input (78) of said AND gate being coupled to receive said first signal (DCLK).

* * * * *